US008814081B2

(12) United States Patent
Gagne et al.

(10) Patent No.: US 8,814,081 B2
(45) Date of Patent: Aug. 26, 2014

(54) AIRCRAFT AND EXTERNAL POD FOR AIRCRAFT

(75) Inventors: Steve Gagne, Avon, IN (US); John R. Arvin, Panama City Beach, FL (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 224 days.

(21) Appl. No.: 12/978,916

(22) Filed: Dec. 27, 2010

(65) Prior Publication Data

US 2012/0160957 A1    Jun. 28, 2012

(51) Int. Cl.
*B64D 41/00*    (2006.01)

(52) U.S. Cl.
USPC .......... 244/58; 244/54; 244/118.2; 244/137.4

(58) Field of Classification Search
USPC ......... 244/137.4, 137.1, 117 R, 118.2, 135 R, 244/135 A, 135 C, 54, 58; 89/1.54
See application file for complete search history.

(56) References Cited

U.S. PATENT DOCUMENTS

| | | | |
|---|---|---|---|
| 3,313,500 A * | 4/1967 | Schmitt | 244/53 R |
| 3,623,494 A | 11/1971 | Poucher | |
| 3,746,283 A | 7/1973 | Morgan | |
| 4,043,522 A | 8/1977 | Vetter | |
| 4,384,453 A | 5/1983 | Tudor et al. | |
| 4,674,704 A | 6/1987 | Altoz et al. | |
| 4,869,071 A | 9/1989 | Wehner et al. | |
| 4,905,937 A | 3/1990 | Spotswood et al. | |
| 6,581,872 B2 | 6/2003 | Walmsley | |
| 7,610,841 B2 * | 11/2009 | Padan | 89/1.815 |
| 2006/0061107 A1 * | 3/2006 | Cadaret | 290/44 |
| 2008/0308671 A1 | 12/2008 | Harnoy | |
| 2009/0060748 A1 | 3/2009 | Landa et al. | |

* cited by examiner

*Primary Examiner* — Rob Swiatek
*Assistant Examiner* — Timothy Schwarz
(74) *Attorney, Agent, or Firm* — Krieg DeVault LLP

(57) ABSTRACT

One embodiment of the present invention is a unique aircraft. Another embodiment is a unique external pod for an aircraft. Other embodiments include apparatuses, systems, devices, hardware, methods, and combinations for aircraft and external pods for aircraft. Further embodiments, forms, features, aspects, benefits, and advantages of the present application will become apparent from the description and figures provided herewith.

23 Claims, 2 Drawing Sheets

US 8,814,081 B2

AIRCRAFT AND EXTERNAL POD FOR AIRCRAFT

FIELD OF THE INVENTION

The present invention relates to aircraft, and more particularly to an aircraft and an external pod for the aircraft.

BACKGROUND

Aircraft and external pods for aircraft remain an area of interest. Some existing systems have various shortcomings, drawbacks, and disadvantages relative to certain applications. Accordingly, there remains a need for further contributions in this area of technology.

SUMMARY

One embodiment of the present invention is a unique aircraft. Another embodiment is a unique external pod for an aircraft. Other embodiments include apparatuses, systems, devices, hardware, methods, and combinations for aircraft and external pods for aircraft. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
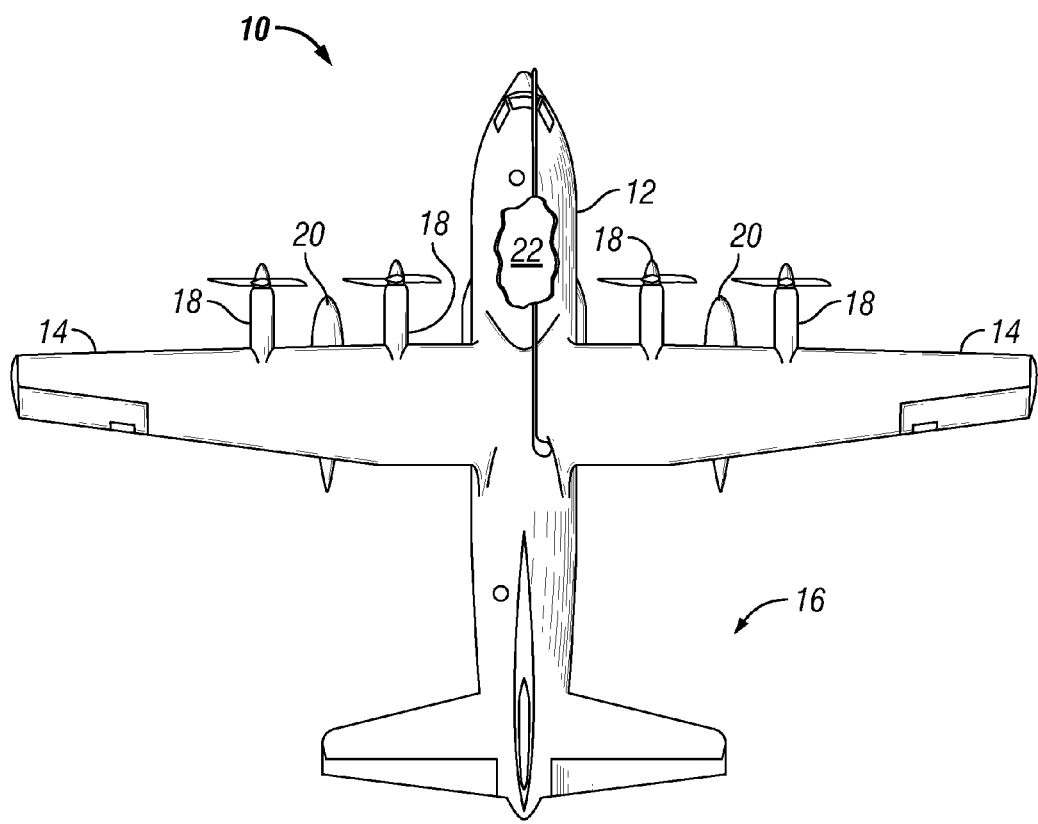
FIG. 1 illustrates a non-limiting example of some aspects of an aircraft in accordance with some embodiments of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated a non-limiting example of some aspects of an aircraft 10 in accordance with an embodiment of the present invention. Aircraft 10 includes a fuselage 12, wings 14, an empennage 16, four gas turbine engine propulsion engines 18 and two external pods 20. In one form, wings 14 and empennage 16 are coupled to fuselage 12; and propulsion engines 18 and external pods 20 are coupled to wings 14. In other embodiments, other coupling arrangements of fuselage 12, wings 14, empennage 16, one or more propulsion engines 18 and one or more external pods 20 may be employed. In one form, aircraft 10 is a multi-engine military turboprop aircraft. In other embodiments, aircraft 10 may be any fixed-wing aircraft, including turbofan aircraft, turbojet aircraft and turboprop aircraft. In still other embodiments, aircraft 10 may be a rotary-wing aircraft or a combination rotary-wing/fixed-wing aircraft. In various embodiments, aircraft 10 may have a single propulsion engine or a plurality of propulsion engines. In addition to propulsion engines, aircraft 10 may include one or more gas turbine auxiliary power units (APUs). In addition, in various embodiments, aircraft 10 may employ any number of wings 14. Empennage 16 may employ a single flight control surface or multiple flight control surfaces. Although the depiction of FIG. 1 illustrates two external pods 20, in other embodiments, any number of external pods 20 may be employed, e.g., one or more external pods 20.

In various embodiments, aircraft 10 has an onboard system 22, such as a directed energy weapon (DEW), for example and without limitation, a high power laser system, a high power microwave system and/or a high power millimeter wave system. In many cases, directed energy weapons require a substantial amount of power for discharging the weapon, e.g., power requirements that exceed the auxiliary power output capabilities of the aircraft propulsion systems and any APUs. In addition, in many cases, substantial thermal loads are generated by directed energy weapons. In some embodiments, substantial amounts of power may be required by other systems installed in or on aircraft 10, such as weapon systems, which may also generate substantial thermal loads. Accordingly, it is desirable to employ additional power sources, such as a turbine driving a generator, and to employ refrigeration or other cooling systems, e.g., one or more coolant or other heat exchangers for managing the thermal loads.

In many cases, however, it is not desirable to install all or part of such power systems and/or refrigeration systems inside fuselage 12, wings 14, or empennage 16, e.g., due to spatial constraints and/or other constraints. Thus, it is desirable to install all or parts of power sources and/or refrigeration systems external to aircraft 10. However, doing so may adversely affect the signature of aircraft 10, e.g., the visible, radar and thermal signature of aircraft 10 as seen by observers external to aircraft 10, which may alert undesirable parties to the fact that aircraft 10 is carrying a system, such as a directed energy weapon, that requires the use of the power source(s) and/or refrigeration system(s) for handling the power and thermal load requirements of the weapon system.

In order to prevent adverse impact to the signature of aircraft 10, one or more of external pods 20 is configured to house all or part of power sources and/or refrigeration systems for handling power and thermal load requirements of system 22. Such external pods 20 are also configured to appear to an external observer as a conventional fuel pod for housing an auxiliary fuel supply that may be coupled to aircraft 10 for extending the flight range and/or duration and/or altitude of aircraft 10 via the provision of the auxiliary fuel from the fuel pod to one or more propulsion engines 18 of aircraft 10. By configuring external pods 20 as such, the signature of aircraft 10 appears like that of a typical aircraft of the same type as aircraft 10 carrying fuel pods, hence reducing the likelihood of an undesirable party detecting that aircraft 10 is equipped with system 22.

Figure 2:
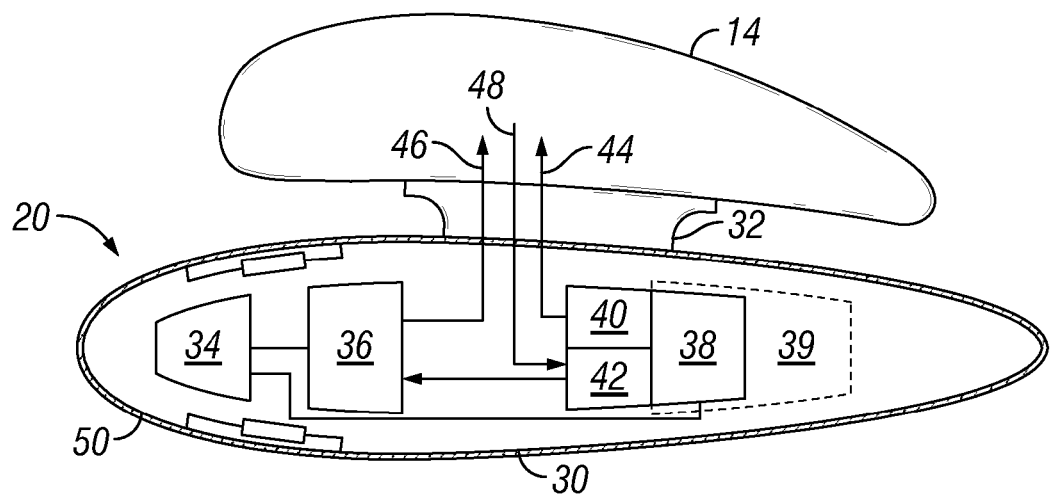
FIG. 2 schematically illustrates a non-limiting example of some aspects of an external pod for an aircraft in accordance with some embodiments of the present invention.

Referring to FIG. 2, a non-limiting example of some aspects of an external pod 20 in accordance with an embodiment of the present invention is schematically depicted. External pod 20 includes a body 30 and an attachment feature 32. In one form, body 30 is configured to house one or more thermodynamic system components and/or power and thermal management system components. In addition, in one form, body 30 is configured to appear to external observers as a fuel pod customarily coupled to the aircraft for providing auxiliary fuel to one or more of propulsion engines 18. In other embodiments, body 30 may not be configured to appear as a fuel pod. In one form, external pod 20 is not configured to carry auxiliary fuel, e.g., for propulsion engines 18, but is configured to appear to external observers that it does carry auxiliary fuel. In other embodiments body 30 may carry fuel in addition to one or more thermodynamic components.

In one form, attachment feature 32 is configured to attach body 30 to aircraft 10, e.g., wings 14 in the depicted embodiment. In other embodiments, attachment feature 32 may be configured to attach to other portions of aircraft 10 in addition to or in place of wings 14. Attachment feature 32 is also coupled to body 30, and is configured to support body 30 and to deliver services to and/or from the thermodynamic system component(s) housed in body 30. The services are delivered between body 30 and one or more portions of aircraft 10 for use with system 22 and/or other systems of or installed in or on aircraft 10. Services include, for example and without limitation, electrical power lines, refrigerant lines, chilled fluid lines, hydraulic lines, coolant lines and/or digital and/or analog communication links.

In one form, the thermodynamic system components housed by body 30 include a diffuser 34; a refrigerant condenser 36; and a turbine 38 configured to provide mechanical power to one or more devices, for example and without limitation, a generator 40 and a refrigerant compressor 42. Power is distributed from generator 40 via one or more power lines 44 to system 22 and/or other systems or components installed in and/or on aircraft 10. In other embodiments, other thermodynamic system components may be housed by body 30 in addition to or in place of those mentioned herein. For example, some embodiments may house one or more heat exchangers within body 30. Such heat exchangers may be configured to cool one or more components of system 22 directly and/or via a cooling medium, such as a cooling fluid. Cooling may be provided to the heat exchangers using ambient air received into body 30 from outside pod 20, e.g., via diffuser 34. In various embodiments, one or more coolant return pumps or refrigerant return pumps may be housed within body 30 or may be housed elsewhere, e.g., inside aircraft 10.

In one form, condenser 36 is in fluid communication with diffuser 34, and is configured to condense a vapor, e.g., a refrigerant vapor using air received from diffuser 34. Condenser 36 is also in fluid communication with refrigerant compressor 42, and operative to receive the refrigerant discharged from refrigerant compressor 42. In one form, a refrigerant output line 46 of condenser 36 is routed to one or more refrigerant receivers, expansion valves, evaporators and/or other refrigerant system components for extracting thermal energy from system 22 and/or other systems installed on or in aircraft 10 via attachment feature 32. Spent refrigerant is returned via a refrigerant return line 48 to refrigerant compressor 42. In some embodiments, additional output lines from condenser 36 may be routed to one or more refrigerant receivers, expansion valves, evaporators and/or other refrigerant system components employed for cooling components housed by body 30, for example and without limitation, one or more turbine lube oil and/or other heat exchangers, generator 40 and/or refrigerant compressor 42.

In one form, turbine 38 is also in fluid communication with diffuser 34. In other embodiments, turbine 38 may be configured to receive air from another source, e.g., bleed air from one or more of propulsion engines 18 delivered via attachment feature 32. In some embodiments, a combustor may be housed in body 30 and be fluidly disposed between turbine 38 and its air source. In some embodiments, a compressor (not shown) may also be housed in body 30, and may be supplied with air from diffuser 34. In some embodiments, body 30 may be configured to house an entire gas turbine engine 39 therein, e.g., of which turbine 38 may be a part. In various embodiments, engine 39 may be supplied with ambient air, e.g., ram air, via diffuser 34 and/or other sources. In various embodiments, body 30 may include insulation and/or other thermal systems configured to yield a thermal signature for external pod 20 similar to that of an external fuel pod, e.g., a fuel pod customarily employed by aircraft 10 for carrying auxiliary fuel for propulsion engines 18.

In addition, in some embodiments, body 30 may be configured to house other systems for storing energy and/or generating electrical power, in addition to or in place of generator 40, in order to supply power to one or more components of system 22. For example and without limitation, one or more batteries (not shown) and/or flywheel/motor/generator systems (not shown) and/or fuel cell systems may be employed to provide and/or store energy for use by one or more components of system 22, e.g., to handle peak loads and/or to provide electrical power to one or more components of system 22 during startup of thermodynamic system components housed within body 30, e.g., turbine 38 and/or engine 39. In various embodiments, such systems for providing and/or storing energy may be disposed completely or partially within external pod 20 or elsewhere within or on aircraft 10. Although diffuser 34, refrigerant condenser 36, turbine 38, engine 39, generator 40 and refrigerant compressor 42 are depicted in certain locations and orientations within body 30 in FIG. 2, it will be understood that in various embodiments, diffuser 34, refrigerant condenser 36, turbine 38, engine 39, generator 40 and refrigerant compressor 42 and/or other components may be disposed in any desired locations and orientations within body 30.

Body 30 includes a nose cone 50 configured to selectively open and close. When open, nose cone 50 is configured to permit the entry of ambient air from outside of pod 20, e.g., ram air, into an interior portion of body 30 during operations of aircraft 10, including ground and flight operations. External pod 20 includes an actuation system 52 that is configured to selectively open and close nose cone 50. Actuation system 52 may receive power, for example and without limitation, hydraulic, pneumatic and/or electrical power, from sources housed within body 30, or may receive the power from sources external to body 30, e.g., via attachment feature 32. In one form, heating devices, e.g., heater mats, may be incorporated into nose cone 50 to reduce the force needed to open and/or close nose 50, e.g., during icing conditions. In one form, diffuser 34 is configured to diffuse the air, e.g., ram air received therein via nose cone 50 when in the open position for provision of the ambient air, e.g., ram air, as mentioned herein.

Figure 3A:
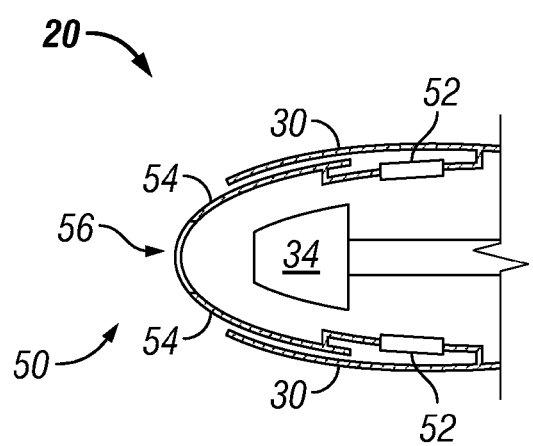
FIGS. 3A and 3B schematically illustrate a non-limiting example of some aspects of a retractable nose cone for an external pod for an aircraft in accordance with some embodiments of the present invention.
Figure 3B:
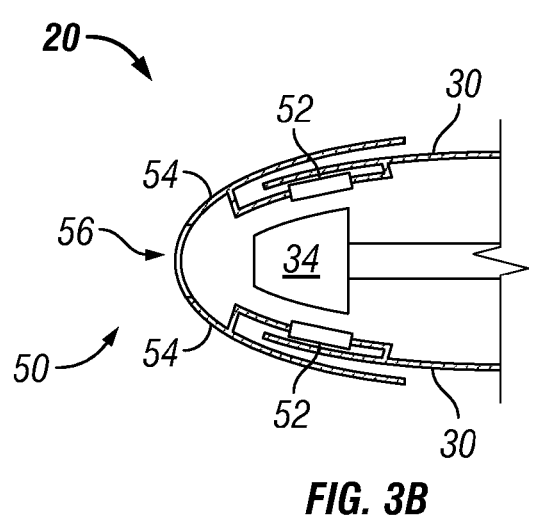

Referring to FIGS. 3A and 3B, in one form, nose cone 50 is divided into a plurality of segments 54 that are configured to retract within body 30 and/or over body 30 to expose diffuser 34 to ambient air, e.g., ram air supplied through the retracted nose cone 50, e.g., during aircraft 10 flight operations. When not retracted, segments 54 form a uniform closed end of body 30, preventing or substantially preventing the entry of ambient air, e.g., ram air into internal portions of body 30, including diffuser 34. When retracted, segments 54 provide one or more openings 56 to expose diffuser 34 and/or other components housed by body 30 to ambient air, e.g., ram air.

Embodiments of the present invention include an external pod for an aircraft, comprising: a body configured to house a thermodynamic system component; an attachment feature coupled to the body and configured to be attached to the aircraft and to deliver services to and/or from the thermodynamic system component, wherein the body is configured to appear to external observers as a fuel pod customarily coupled to the aircraft for providing auxiliary fuel to a propulsion engine of the aircraft.

In a refinement, the external pod is not configured to carry auxiliary fuel for a primary propulsion engine of the aircraft.

In another refinement, the external pod further comprises a nose cone configured to selectively open and close.

In yet another refinement, the nose cone is configured to permit an entry of air into an interior portion of the body during operations of the aircraft.

In still another refinement, the external pod further comprises an actuation system configured to selectively open and close the nose cone.

In yet still another refinement, the body includes a diffuser configured to diffuse air.

In a further refinement, the external pod further comprises a nose cone configured to selectively retract into and/or over the body to expose the diffuser to air supplied through the retracted nose cone.

In a yet further refinement, the attachment feature is configured to attach to a wing of the aircraft.

In a still further refinement, the thermodynamic system component is a turbine configured to provide mechanical power to a device.

In a yet still further refinement, the device is a generator.

In an additional refinement, the device is a refrigerant compressor.

In another additional refinement, the thermodynamic system component is a refrigerant condenser configured to condense a refrigerant vapor.

In yet another additional embodiment, the thermodynamic system component is a gas turbine engine disposed within the body.

Embodiments of the present invention include an aircraft, comprising: a fuselage; a wing coupled to the fuselage; an empennage coupled to at least one of the fuselage and the wing; a propulsion engine coupled to the aircraft; and an external pod coupled to the aircraft, wherein the external pod includes a body configured to house a thermodynamic system component; an attachment feature coupled to the body and configured to be attached to the aircraft and to deliver services to and/or from the thermodynamic system component, wherein the body is configured to appear to external observers of the aircraft as a fuel pod customarily coupled to the aircraft for providing auxiliary fuel to the propulsion engine of the aircraft.

In a refinement, the external pod is not configured to carry auxiliary fuel for the propulsion engine of the aircraft.

In another refinement, the aircraft further comprises a nose cone and an actuation system, wherein the nose cone is configured to selectively open and close to permit an entry of air into an interior portion of the body during operations of the aircraft; and wherein the actuation system configured to selectively open and close the nose cone.

In yet another refinement, the body includes a diffuser configured to diffuse air; and wherein the nose cone is configured to selectively retract into and/or over the body to expose the diffuser to air supplied through the retracted nose cone during flight operations of the aircraft.

In still another refinement, the thermodynamic system component is at least one of a refrigerant condenser and a turbine; wherein the refrigerant condenser is configured to condense a refrigerant vapor; and wherein the turbine is configured to provide mechanical power to a device.

In yet still another refinement, wherein the device is at least one of a generator and a refrigerant compressor.

In a further refinement, the body is configured to house a gas turbine engine.

Embodiments of the present invention include an aircraft, comprising: a fuselage; a wing coupled to the fuselage; an empennage coupled to at least one of the fuselage and the wing; a propulsion engine coupled to the aircraft; and means for housing a thermodynamic system component and for delivering services to and/or from the thermodynamic system component, wherein the means for housing is configured to appear to external observers of the aircraft as a fuel pod customarily coupled to the aircraft for providing auxiliary fuel to the propulsion engine of the aircraft.

In a refinement, the means for housing includes means for selectively permitting an entry of air into an interior portion of the means for housing during operations of the aircraft.

In another refinement, the means for housing is configured to house a gas turbine engine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An external pod for an aircraft, comprising:
    a body having a thermodynamic system component, wherein the body is shaped like a fuel pod that is configured to be attached to the aircraft and to supply extra fuel to the aircraft;
    an attachment feature coupled to the body and configured to be attached to the aircraft and to permit deliveries between the thermodynamic system component and the aircraft; and
    a nose cone configured to selectively open and close during flight, wherein when the nose cone is in the open position during flight, ram air passes through the nose cone to an interior portion of the body and wherein when the nose cone is in the closed position during flight, ram air is prevented from passing through the nose cone into the interior portion of the body.

2. The external pod of claim 1, wherein the external pod is not configured to carry auxiliary fuel for a primary propulsion engine of the aircraft.

3. The external pod of claim 1, further comprising an actuation system configured to selectively open and close the nose cone.

4. The external pod of claim 1, further comprising a diffuser configured to diffuse the ram air entering the interior portion of body when the nose cone is in the open position.

5. The external pod of claim 4, wherein when the nose cone is in the closed position during flight: at least a portion of the nose cone is retracted into the body exposing the diffuser to the ram air passing through the nose cone; or at least a portion of the nose cone is retracted over an external aerodynamic surface of the body to expose the diffuser to the ram air passing through the nose cone; or a first portion of the nose cone is retracted into the body and a second portion of the nose cone is retracted over the external aerodynamic surface of the body to expose the diffuser to the ram air passing through the retracted nose cone.

6. The external pod of claim 1, wherein the attachment feature is configured to attach to a wing of the aircraft.

7. The external pod of claim 1, wherein the thermodynamic system component is a turbine.

8. The external pod of claim 7, wherein the body further includes a generator and wherein the generator is at least partially powered by the turbine during flight.

9. The external pod of claim 7, wherein the body further includes a refrigerant compressor and wherein the refrigerant compressor is at least partially powered by the turbine during flight.

10. The external pod of claim 1, wherein the thermodynamic system component is a refrigerant condenser.

11. The external pod of claim 1, wherein the thermodynamic system component is a gas turbine engine.

12. The external pod of claim 1, wherein the nose cone is formed of a plurality of segments configured to separate from each other to form an opening configured to receive the ram air into the interior portion of the body in the open position, and configured to cooperatively engage each other to prevent the entry of the ram air into the interior portion of the body.

13. An aircraft, comprising:
a fuselage;
a wing coupled to the fuselage;
an empennage coupled to at least one of the fuselage and the wing;
a propulsion engine coupled to the aircraft; and
an external pod coupled to the aircraft, wherein the external pod includes a body having a thermodynamic system component; and an attachment feature coupled to the body and configured to be attached to the aircraft and to permit deliveries between the thermodynamic system component and the aircraft; and
a nose cone configured to selectively open and close during flight, wherein when the nose cone is in the open position during flight, ram air passes through the nose cone to an interior portion of the body and wherein when the nose cone is in the closed position during flight, ram air is prevented from passing through the nose cone into the interior of the body.

14. The aircraft of claim 13, wherein the external pod is not configured to carry auxiliary fuel for the propulsion engine of the aircraft.

15. The aircraft of claim 13, further comprising a an actuation system configured to selectively open and close the nose cone.

16. The aircraft of claim 15, further comprising a diffuser configured to diffuse the ram air entering the interior portion of body when the nose cone is in the open position.

17. The aircraft of claim 13, wherein the thermodynamic system component is at least one of a refrigerant condenser and a turbine.

18. The aircraft of claim 17, wherein the body further includes a generator and wherein at least one of the generator and the refrigerant compressor is at least partially powered by the turbine during flight.

19. The aircraft of claim 13, wherein the body further includes a gas turbine engine.

20. The external pod of claim 13, wherein the nose cone is formed of a plurality of segments configured to separate from each other, wherein the segments retract into the interior of the body to place the nose cone in the open position; or wherein the segments retract over an exterior surface of the body to place the nose cone in the open position; or wherein some of the segments retract into the interior of the body and some of the segments retract over the exterior surface of the body to place the nose cone in the open position.

21. An aircraft, comprising:
a fuselage;
a wing coupled to the fuselage;
an empennage coupled to at least one of the fuselage and the wing;
a propulsion engine coupled to the aircraft; and
means for housing a thermodynamic system component and for permitting deliveries between the thermodynamic system component and the aircraft,
wherein the means for housing is shaped like a fuel pod that is configured to be attached to the aircraft and to supply extra fuel to the aircraft; and
a nose cone configured to selectively open and close during flight, wherein when the nose cone is in the open position during flight, ram air passes through the nose cone to an interior portion of the body and wherein when the nose cone is in the closed position during flight, ram air is prevented from passing through the nose cone into the interior portion of the body.

22. The aircraft of claim 21, wherein the means for housing is configured to house a gas turbine engine.

23. The external pod of claim 21, wherein the nose cone is formed of a plurality of segments configured to separate from each other, wherein the segments retract into the interior of the body to place the nose cone in the open position; or wherein the segments retract over an exterior surface of the body to place the nose cone in the open position; or wherein some of the segments retract into the interior of the body and some of the segments retract over the exterior surface of the body to place the nose cone in the open position.

* * * * *